Figure 1:
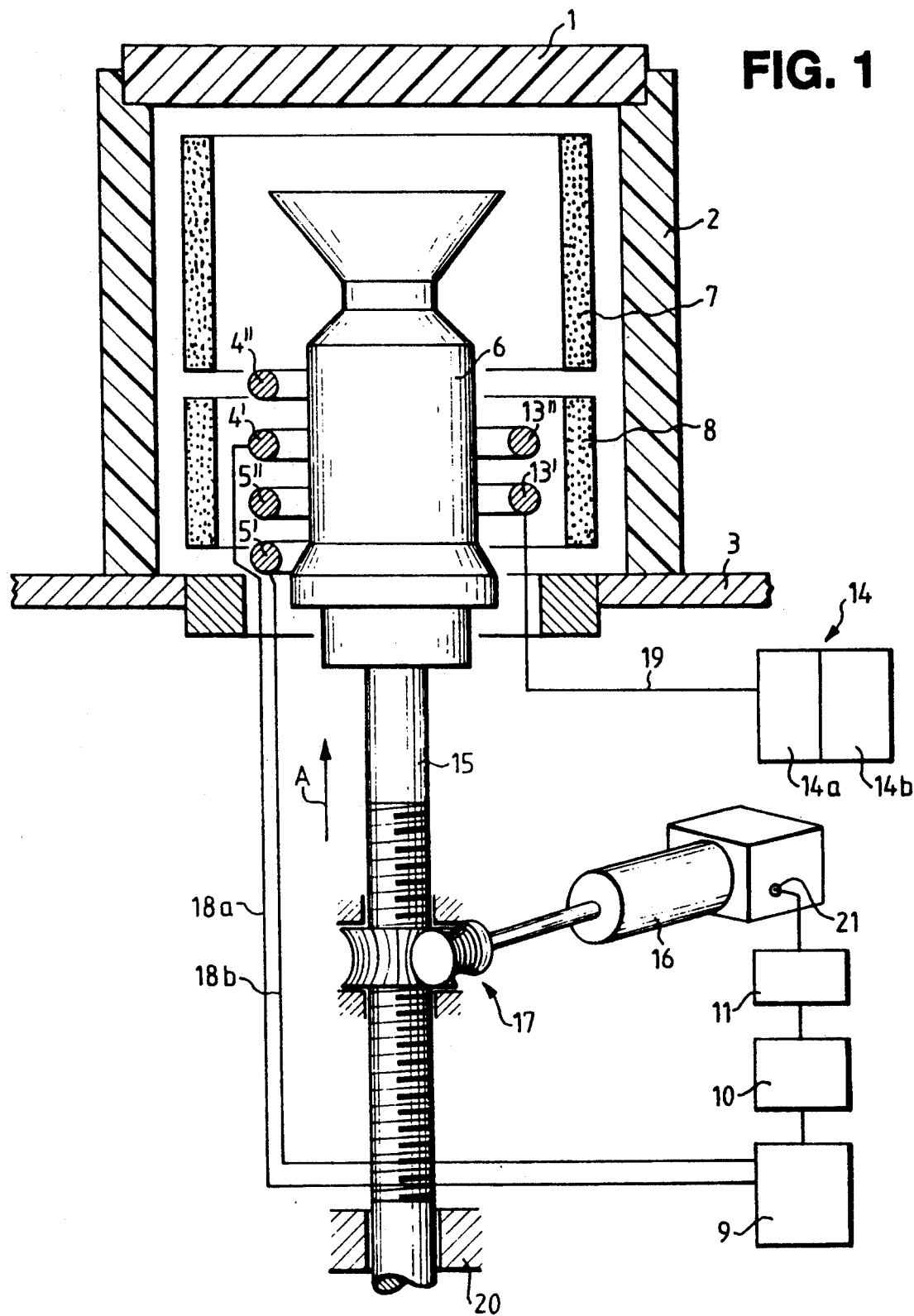

United States Patent [19]
Mosch et al.

[11] Patent Number: 5,232,043
[45] Date of Patent: Aug. 3, 1993

[54] DEVICE FOR IDENTIFYING THE SOLID-LIQUID INTERFACE OF A MELT

[75] Inventors: Johannes Mosch, Alzenau; Erwin Wanetzky, Grosskrotzenburg, both of Fed. Rep. of Germany

[73] Assignee: Leybold Aktiengesellschaft, Hanau, Fed. Rep. of Germany

[21] Appl. No.: 574,536

[22] Filed: Aug. 24, 1990

Related U.S. Application Data

[63] Continuation of Ser. No. 365,319, Jun. 13, 1989, abandoned.

[30] Foreign Application Priority Data

Mar. 14, 1989 [DE] Fed. Rep. of Germany ....... 3908199

[51] Int. Cl.$^5$ ............... B22D 27/04; B22D 41/01
[52] U.S. Cl. ................... 164/150; 164/122; 164/338.1
[58] Field of Search ........ 164/122, 122.1, 150, 164/154, 338.1, 256, 257, 258, 458

[56] References Cited

U.S. PATENT DOCUMENTS

| | | | |
|---|---|---|---|
| 3,897,815 | 8/1975 | Smashey | 164/122.1 |
| 4,144,756 | 3/1979 | Linder | |
| 4,158,379 | 6/1979 | Yarwood et al. | 164/467 |
| 4,178,986 | 12/1979 | Smashey | 164/338.1 |
| 4,415,017 | 11/1983 | Yarwood et al. | 164/453 |
| 4,495,983 | 1/1985 | Kindlmann et al. | 164/452 |
| 4,602,768 | 7/1986 | Tinnes et al. | |
| 4,816,758 | 3/1989 | Theissen et al. | |

FOREIGN PATENT DOCUMENTS

| | | |
|---|---|---|
| 0077747 | 6/1982 | European Pat. Off. |
| 0192043 | 8/1986 | European Pat. Off. |
| 0312799 | 4/1989 | European Pat. Off. |
| 2722475 | 5/1977 | Fed. Rep. of Germany |
| 2722506 | 5/1977 | Fed. Rep. of Germany |
| 2823713 | 5/1978 | Fed. Rep. of Germany |
| 3110900 | 3/1981 | Fed. Rep. of Germany |
| 3142681 | 10/1981 | Fed. Rep. of Germany |
| 3423977 | 6/1984 | Fed. Rep. of Germany |
| 3427268 | 7/1984 | Fed. Rep. of Germany |
| 3439369 | 10/1984 | Fed. Rep. of Germany |
| 480493 | 5/1976 | U.S.S.R. ............ 164/122.1 |
| 834783 | 5/1960 | United Kingdom |
| 1434227 | 5/1976 | United Kingdom |
| 1471480 | 4/1977 | United Kingdom |
| 1585212 | 2/1981 | United Kingdom |
| 1585496 | 3/1981 | United Kingdom |
| 2142729A | 6/1984 | United Kingdom |

Primary Examiner—Mark Rosenbaum
Assistant Examiner—Rex E. Pelto
Attorney, Agent, or Firm—Felfe & Lynch

[57] ABSTRACT

In a device for identifying the solid-liquid-interface of a melt while withdrawing the poured full ceramic mold 6 from the heater 7, 8 which at least partially encloses the casting mold 6, the mold 6 is at least partially enclosed by two receiving loops 4, 5 disposed in the inside of the heater 7, 8 and a polarizing transmitting loop 13; the induction or receiving loops 4, 5 are coupled with an electric evaluation circuit 9, 10, 11 and polarizing transmitting loop 13 which is connected to a transmitter 14 sends a signal into the casting mold 6 the level of which is sensed by the receiving loops 4, 5 and the so obtained signals create a value for the solidification of the melt in the casting mold 6 by determining the difference of inductivity between ordered, crystalline and disordered, liquid metal mass.

9 Claims, 3 Drawing Sheets

DEVICE FOR IDENTIFYING THE SOLID-LIQUID INTERFACE OF A MELT

This application is a continuation of application Ser. No. 365,319, filed Jun. 3, 1989 now abandoned.

The invention relates to a device for identifying the solid-liquid interface of a melt while withdrawing the poured full ceramic casting mold from the heater which at least partially encloses the casting mold.

It is known that the readiness with which the melt of a poured part cools down has substantial influence on the quality of the cast workpiece.

Further, it is known that the magnetic condition of a body becomes apparent in its environment by the effects of force and induction; in this connection, the magnetism of the ions and the electrons can be referred to as the "primary" magnetism. The "secondary" magnetism, as opposed to this, is characterized by permeability, coercive force, remanence, and saturation.

The paramagnetism of the metals among the "transition elements," having an increasing atomic number, constantly rises. The present invention proceeds on the assumption that the metal melt and the solidified block are paramagnetic while the magnetism of the metals is composed of the magnetism of the ions and the superimposed percentage of the electron gas. The magnetism of the electron gas depends on the temperature and the field strength and the alignment of the element magnets in the magnetic fields involves action. In a crossed magnetic field it is therefore possible to sense this reorientation by means of an appropriate receiver and the difference between the solid and the liquid phase can be registered.

The poured full casting mold is in most cases not dynamically balanced. They are, e.g. turbine vanes which have in radial as well as in axial direction complex contours and different wall thicknesses. Hence, the signal difference between solid and liquid is by far greater than the interfering effects caused by mold changes.

It is an object of the present invention to create a device which is suitable for using the signal differences for the controlled lowering of the casting mold from a heater.

The object is achieved in accordance with the invention in that the casting mold is at least partially enclosed by two receiving loops disposed in the interior of the heater and a polarizing transmitting loop; the induction or receiving loops are coupled with an electric evaluation circuit and the polarizing transmitting loop connected to a transmitter sends a signal in the casting mold. The receiving loops sense the level and the so obtained signals form a value for the solidification of the melt in the casting mold by using the difference in inductivity between ordered crystalline and disordered, solid metal mass.

Preferably, the casting mold can be moved in its position with respect to the heater and is guided, for example on a vertically disposed support bolt which can be moved up and down by means of a motor. For this purpose, the support bolt interacts with a motor-driven mechanism unit and the evaluation circuit activates the motor and the support bolt moves down corresponding to the progress of the solid-liquid interface fo the melt in the mold.

In anlternative embodiment, the casting mold can also be moved in its position with respect to the heater and is guided, for example, on a vertically disposed support which can be moved up and down by means of a motor; however, the support bolt interacts with lifting cylinder to which hydraulic pressure can be supplied; the hydraulic pressure generator and/or the hydraulic valves thereof can be activated by the evaluation circuit, as it is commonly known, such that the support bolt can be moved down in the casting mold corresponding to the progress of the liquid-solid interface of the melt.

Advantageously, two receivers or receiving loops are provided which annularly enclose the casting mold in a distance and are disposed on different planes which are parallel to each other. Both are connected to the evaluation circuit; the evaluation circuit includes a control loop and an amplifier connected to the drive motor of the driving gear unit or the hydro-pump for the hydraulic lifting cylinder.

The excitation frequency and the power for the polarization antenna can be selected via the high frequency noise signal generator including the noise signal amplifier and the transmitter.

In a preferred embodiment every receiving sensor is configured as a half-cup-like shaped receiving loop each of which consists of two semicircularly bent wire parts which are disposed on different planes on top of each other and congruent; the respective external ends of each pair of wire parts are connected to each other by vertically extending wire segments and one of the semicircularly bent wire parts of the receiving loops, respectively, is cut open and the resulting ends function as connectors for the amplifier of the evaluation circuit.

Opposite the two receiving loops, there is a polarizing transmitting loop disposed, the configuration of which corresponds approximately to the one of the receiving loops; the connection with the transmitter is made via electrical conductors.

Advantageously, the transmitter connected to the polarizing transmitting loop includes a noise signal amplifier and a high frequency noise signal generator.

The distance between two semicircularly bent wire parts which belong to a transmitting loop or a receiving loop, respectively, is of—as a function of the used excitation frequency—different size; the two semicircularly bent wire parts of the transmitting loop are provided between the planes, respectively, in which the external semicircularly bent wire parts of the two receiving loops, respectively, are disposed.

The invention permits the most various embodiments; one of which is diagrammatically illustrated in detail in the attached drawing.

Referring now to the drawings

Figure 2:
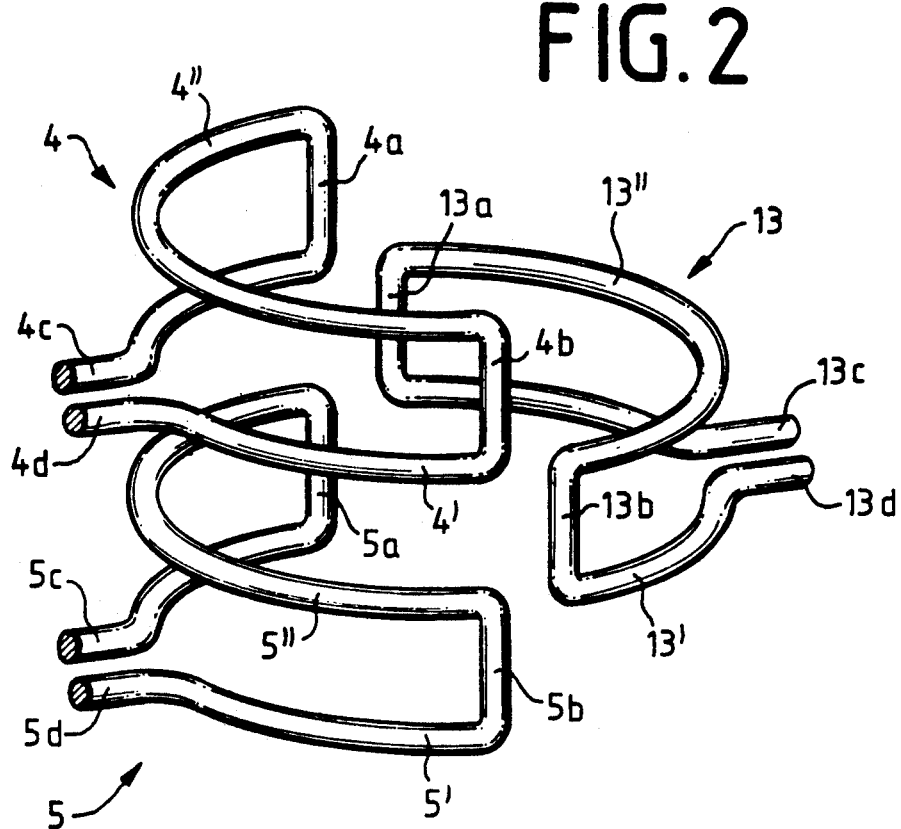
Figure 3:
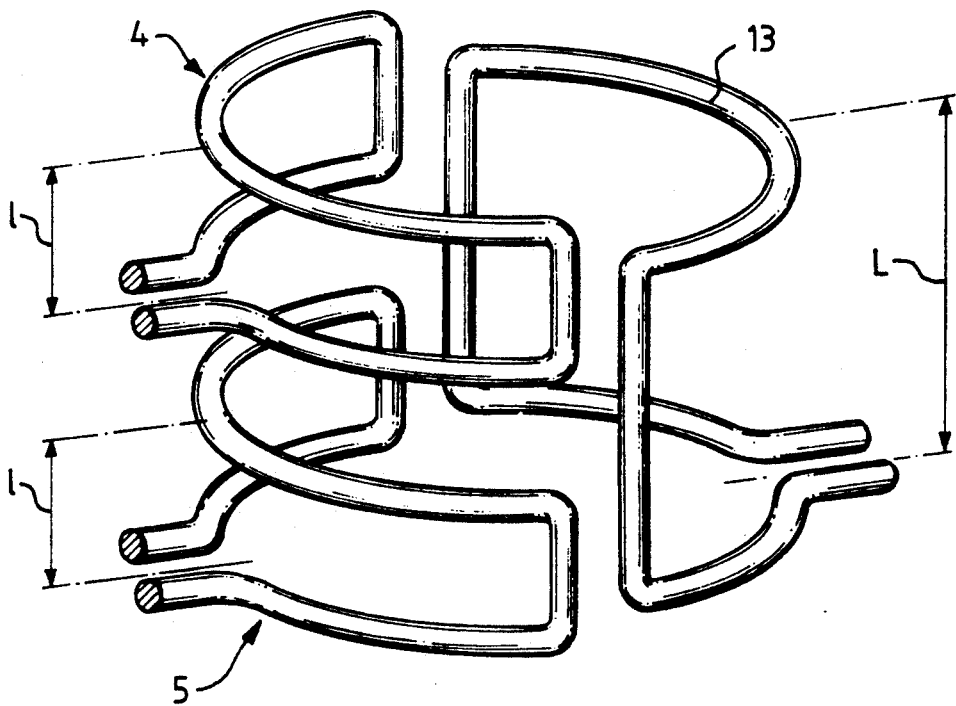
Figure 4:
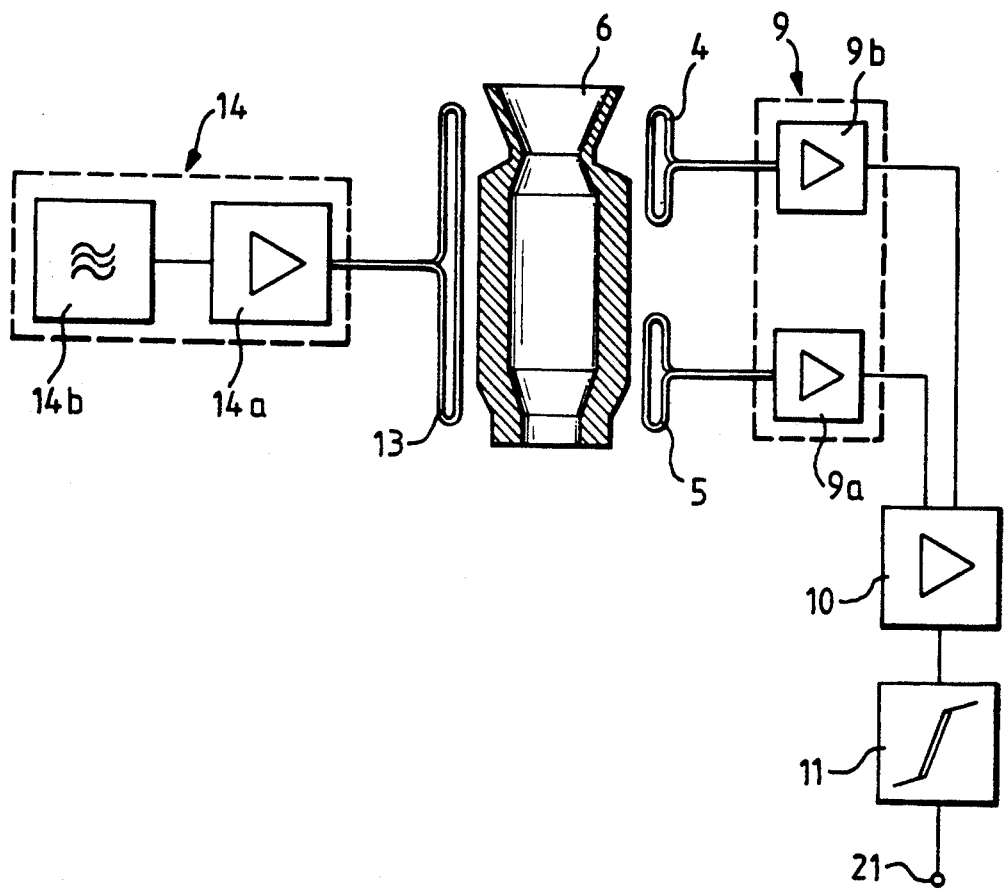

FIG. 1 is a lateral view of a device illustrating the heater including the heating elements a well as a cross section of the transmitting and receiving loops, FIGS. 2 and 3 show a perspective view of the transmitting and the receiving loops according to FIG. 1 in two different embodiments, FIG. 4 is a block circuit diagram of the device according to FIGS. 1 to 3.

Basically, the device includes a hollow cylindrical housing 2 made of a heat insulated material which is placed on a platform or a stage 3 and the top of this housing is closed by a cover 1; the device further includes two hollow cylindrical resistor heat elements 7, 8 supported in the interior of the housing 2, a support bolt 15 which is mounted and guided in a base rack 20 not represented in detail and the casting mold 6 supported on this bolt, the two receiving loops 4, 5 cup-like enclosing the casting mold 6, the polarizing transmitting loop 13 disposed opposite the receiving loops 4, 5 and also enclosing the casting mold 6, the motor 16 with a driving gear unit 17, the evaluation circuit including the amplifier 9, the comparator 10 and limiting circuit 11 and finally, the transmitter 14 including the noise signal amplifier 14a and the high frequency noise signal generator 14b.

After pouring full, the casting mold 6 is introduced into the housing 2 upwardly from the bottom in direction of arrow A by means of the support bolt 15 which can be driven by the motor 16 with the driving gear unit 17; the top of this housing 2 is closed by a cover 1; the resistor heaters 7, 8 are in operation then and ensure that the melt does not cool down too rapidly and uncontrolled.

In order to cool down the melt, the casting mold 6 can now be lowered against the direction of arrow A. In order to perform this in a controlled way, the transmitter 14 sends a signal via transmitting loop 13 into the casting mold 6 which, in turn, is received by the two receiving loops 10, 11 and processed in the evaluation circuit 9 and transformed into a corresponding command for activating the motor and hence, the lowering of the support bolt 15 with the casting mold 6.

Hence, it is the object of the aforesaid sensor system to supply a signal for controlling the withdrawal so as to permanently ensure a stationary position of the liquid-solid phase interface.

The sensor system includes the transmitting and receiving devices as they are principally illustrated in FIGS. 1 and 4. The transmitter is a high frequency noise signal generator 14b which sends a signal into the casting mold 6 via a wide band amplifier or noise signal amplifier 14 a and a polarizing transmitting loop 13. A liquidus receiving loop 4 and a solidus receiving loop 5 which receive this signal after passing through the liquid and solid material are on the opposite side of the casting mold 6. Due to the ordered crystalline structure of the material the signals received are distorted by the self resonance of the crystal lattice. The signals can be distinguished by the self resonance of the crystal lattice. The signals received ar correlated. The phase interface is located if the correlated signal has reached a maximum value. Shifting the phase interface in the direction to the liquidus-loop 4 as well as to the solidus-loop 5 reduces the effective signal.

As FIGS. 3 and 4 show the transmitting loop 13 can have a different configuration as opposed to the two receiving loops 4, 5. The distance L of the two semicircularly bent wire parts can be larger than the distances $l_1$ and $l_2$ which are the distances of the semicircularly bent wire parts to each other in a receiving loop 4 and 5, respectively.

We claim:

1. Device for identifying the solid-liquid interface of a melt, comprising:

a poured full ceramic casting mold;
a heater which at least partially enclosed the mold;
two receiving loop means partially enclosing the mold and disposed in the interior of the heater;
a polarizing transmitting loop means;
an electric evaluation circuit, the receiving loop means being coupled to said circuit;
a transmitter, the polarizing transmitting loop means being coupled to the transmitter for sending a signal into the casting mold, the two receiving loop means being means for sensing the level of the signal after passing through the mold for obtaining signals which create a value for a position of a solid-liquid interface of the melt in the casting mold by using the difference of inductance between ordered, crystalline solid metal mass and disordered, liquid metal mass,
said evaluation circuit being means for supplying a signal for withdrawal of the casting mold which signal ensures a stationary position of the liquid-solid interface.

2. Device in accordance with claim 1 which includes a vertically disposed bolt and a drive motor for moving the bolt up and down and a driving gear unit for coupling the motor to the bolt and in which the casting mold is movably mounted and guided in its position with respect to the heater while resting on the vertically disposed support bolt and in which the evaluation circuit activates the motor and the support bolt moves up according to the progress of the solid-liquid interface of the melt in the mold.

3. Device in accordance with claim 2 in which the two receiving loop means partially annularly enclose the casting mold at a distance and are disposed on different planes parallel to each other in which the evaluation circuit includes an amplifier coupled to the drive motor.

4. Device in accordance with claim 1 which includes a vertically disposed bolt and a motor for moving the bolt up and down and a lifting cylinder and a hydraulic pressure generator for applying hydraulic pressure to the lifting cylinder and in which the evaluation circuit activates the evaluation circuit for moving the support bolt down corresponding to the progress of the solid-liquid interface of the melt in the casting mold.

5. Device in accordance with claim 1 in which the transmitter determines excitation frequency and power for the polarizing transmitting loop means.

6. Device in accordance with claim 1 in which each receiving loop means is configured as a half-cup shaped receiving loop each of which includes two semicircularly bent wire portions which are placed one on top of another and are congruent, the individual wire portions of the receiving loops each having tow respective external ends connected by vertically extending wire segments and one of the semicircularly bent wire portions of each receiving loop having ends for connection to the evaluation circuit.

7. Device in accordance with claim 1 in which the polarizing transmitting loop means is disposed opposite the receiving loop means and has a configuration corresponding to one of the receiving loop means.

8. Device in accordance with claim 1 in which the transmitter includes a noise signal generator and a noise signal amplifier.

9. Device in accordance with claim 1 in which each receiving loop means includes two semicircularly bent wire portions placed in planes and the transmitting loop means includes two semicircularly bent wire portions disposed between the planes of the semicircularly bent wire portions of the receiving means.

* * * * *